United States Patent
Burridge et al.

(10) Patent No.: US 6,336,146 B1
(45) Date of Patent: *Jan. 1, 2002

(54) METHOD AND APPARATUS FOR DOCKING, LAUNCHING AND RUNNING APPLICATIONS IN A FOREIGN ENVIRONMENT

(75) Inventors: Richard Burridge, Mountain View; Roger Calnan, Palo Alto, both of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/577,774

(22) Filed: Dec. 22, 1995

(51) Int. Cl.[7] .................................................. G06F 9/00
(52) U.S. Cl. .................................................... 709/310
(58) Field of Search ......................... 395/682, 500, 395/339, 340, 680; 345/339, 340; 709/302, 300, 310, 328

(56) References Cited

U.S. PATENT DOCUMENTS 5,083,262 A * 1/1992 Haff, Jr. ..................... 395/500
5,146,556 A * 9/1992 Hullot et al. ............... 395/159

(List continued on next page.)

OTHER PUBLICATIONS

DataFocus, Inc., DataFocus White Paper: Porting UNIX X/Motif Software to Windows NT, NutCracker, 1996.*

(List continued on next page.)

Primary Examiner—St. John Courtenay, III
Assistant Examiner—Sue Lao
(74) Attorney, Agent, or Firm—J. D. Harriman, II, Esq.; Coudert Brothers, LLP

(57) ABSTRACT

The same "look and feel" of environment applications is given to non-environment, or foreign, applications. Like environment applications, a non-environment application is docked, launched and run in the environment. There is no need to modify a foreign application to run in the environment. When a foreign application is docked, a wrapper application is associated with the foreign application. The wrapper application launches the foreign application, awaits a notification regarding a change in status for the foreign application, and communicates with the environment's docking application regarding the status of the foreign application. The same menu that is created for environment applications is created for the foreign application that allows a user to manipulate the foreign application's windows and execution. The dock tile associated with the foreign application is modified to reflect changes in the status of the application. The wrapper application is used to manage a single foreign application. Alternatively, a wrapper application can be used to manage multiple foreign applications (e.g., multiple instances of different foreign applications or multiple instances of the same foreign application). With the present invention, there is no need to re-write a non-environment application to make it compatible with an environment. Using the present invention, an application is compatible with a foreign environment. Thus, legacy applications can be used in the environment without modifying the application.

1 Claim, 7 Drawing Sheets

U.S. PATENT DOCUMENTS

| | | | | |
|---|---|---|---|---|
| 5,210,824 A | * | 5/1993 | Putz et al. | 395/145 |
| 5,220,675 A | * | 6/1993 | Padawer et al. | 395/800 |
| 5,274,819 A | * | 12/1993 | Blomfield-Brown | 395/700 |
| 5,276,883 A | | 1/1994 | Halliwell | |
| 5,339,422 A | * | 8/1994 | Brender et al. | 395/700 |
| 5,390,314 A | * | 2/1995 | Swanson | 395/500 |
| 5,432,925 A | * | 7/1995 | Abraham et al. | 395/500 |
| 5,457,798 A | * | 10/1995 | Alfredsson | 395/700 |
| 5,475,845 A | * | 12/1995 | Orton et al. | 395/700 |
| 5,542,078 A | * | 7/1996 | Martel et al. | 395/600 |
| 5,600,776 A | * | 2/1997 | Johnson et al. | 395/326 |
| 5,613,090 A | * | 3/1997 | Willems | 395/500 |
| 5,644,739 A | * | 7/1997 | Moursund | 395/354 |
| 5,764,984 A | * | 6/1998 | Loucks | 395/682 |
| 5,774,720 A | * | 6/1998 | Borgendale et al. | 395/682 |
| 5,812,848 A | * | 9/1998 | Cohen | 395/685 |
| 5,825,357 A | * | 10/1998 | Malamud et al. | 345/340 |

OTHER PUBLICATIONS

Sun Microsystems, Inc., Open Look Graphical User Interface Functional Specification, Addison–Wesley, pp. 263–288, Nov. 1989.*

N. Gurewich, et al, Master Visual Basic 3, SAM Publishing, chapter 34, pp. 960–968, 1994.*

Kathy Ivens: "OS/2 Warp Answers" 1995, Osborne McGraw–Hill, California, US XP002098869, pp. 62–64.

IBM International Technical Support Centers: "OS/2 Version 2.0—vol. 2: DOS and Windows Environment" Apr. 1992, IBM Corporation, International Technical Support Center, Florida, USA XP002098936, pp. 134–204.

* cited by examiner

METHOD AND APPARATUS FOR DOCKING, LAUNCHING AND RUNNING APPLICATIONS IN A FOREIGN ENVIRONMENT

BACKGROUND OF THE INVENTION

1. Field of the Invention

This invention relates to the docking, running and launching of applications in an environment.

2. Background

OpenStep™ is an open, high-volume portable standard for object-oriented computing. It provides a standard application programming interface (API). The OpenStep specification is based on NeXTStep™. NeXTStep is an object-oriented operating system of NeXT Computer, Inc. (OpenStep and NeXTStep are trademarks or registered trademarks of NeXT Computer, Inc.

An implementation of OpenStep is available from Sun Microsystems, Inc. that runs on top of OpenWindows™. OpenWindows is a windowing system that is based on the X11 windowing specification. OpenWindows runs on Solaris™, an operating system available from Sun Microsystems, Inc. (Sun Microsystems, Inc., OpenWindows, and Solaris are trademarks or registered trademarks of Sun Microsystems, Inc. in the U.S. and certain other countries.)

OpenStep provides an environment for developing applications. Applications written using OpenStep are referred to as OpenStep applications. Applications that are not written using the OpenStep API are referred to as non-OpenStep applications. Examples of non-OpenStep applications include OpenLook Desktop applications, Motif applications and X applications.

The OpenStep environment includes a workspace application called the Dock. The Dock facilitates the use of OpenStep applications. The Dock uses a region of the workspace screen (e.g., the right-hand side of the screen). From the user standpoint, the Dock consists of a set of icons that are displayed on the screen (e.g., icons are displayed vertically along the right-hand edge of the screen). These icons represent OpenStep applications.

The icon consists of an image that is recognizable to the user as being associated with the corresponding application. The icon further contains an indicator (e.g., a set of three dots) that are used to identify whether the corresponding application is currently running. The user can launch a docked OpenStep application by selecting (e.g., double-clicking a button on a pointing device such as a mouse) the corresponding icon in the Dock. When an application is launched, the Dock removes the indicator from the icon. This signifies that the docked application has been launched.

An OpenStep application is added to the Dock by dragging the icon that represents an OpenStep application to the region of the screen used by the Dock application. This process of adding an OpenStep application to the Dock is referred to as "docking" the application. Similarly, an application can be removed from the Dock by dragging the application's icon out of the region of the screen used by the Dock.

The Dock application identifies and maintains certain defaults or information about a "docked" OpenStep application. For example, the Dock maintains path information that is used to locate a docked application. The path information identifies a directory that contains the OpenStep application. The directory contains an executable file for the application. In addition, the directory contains resources (e.g., images, sounds, localization of files and Interface Builder files) needed by the application. When a docked application is launched, the Dock locates the docked application's corresponding application and launches the application's executable contained in this directory.

It is only possible to dock OpenStep applications. It would be beneficial to be able to dock and launch non-OpenStep applications. For example, it would be beneficial to dock OpenLook Desktop applications, X11 applications, and shell scripts. It would be beneficial to be able to associate an icon with a non-OpenStep application in the Dock and to modify the icon to indicate the state of the application.

Further, it is not possible for the Dock to understand command line arguments. It would be beneficial to be able to associated command line arguments with an application such that these arguments are accessed when the application is launched.

SUMMARY OF THE INVENTION

The capability to dock, launch and run an application in an environment is extended to a foreign application. The same "look and feel" of environment applications is given to non-environment, or foreign, applications. A wrapper application is associated with a foreign application and manages the foreign application. It communicates with an environment's docking application regarding the status of the foreign application.

From the user's viewpoint, a foreign application has the same "look and feel" as an environment application. Like environment applications, the user drags the foreign application's icon to a docking region to dock the application. A docked application (foreign or environment) is launched by a user by selecting the docked applications icon, or tile. A menu window is associated with the docked application that provides the user with a selection for hiding or terminating the application. The docked application tile is modified to provide information on the status of the docked application.

When the foreign application is to be launched, path information is used to locate the wrapper application and the foreign application. The wrapper application is launched. The wrapper application launches the foreign application. The tile associated with the foreign application is modified (e.g., ellipsis removed and tile grayed) to illustrate that the foreign application has been launched. The wrapper application creates a menu for the foreign application that includes selections for manipulating the application's windows and execution.

Once the foreign application is launched, the wrapper application waits for a notification regarding the status of the application. The foreign application's status can change, for example, when the user selects an operation from the foreign application's menu created by the wrapper application. The wrapper application processes the notification.

When the user selects a "Quit" operation, the wrapper application terminates the foreign application. Then, the wrapper application terminates. The termination of the wrapper application notifies the docking application that the foreign application is terminated. The foreign application's icon is modified to reflect its new status (e.g., ellipsis added to the icon).

When the user selects a "Hide" operation, the wrapper application hides the foreign application's main window. For example, the wrapper application unmaps the foreign application window when a hide operation is selected.

A wrapper application can be used to manage a single foreign application. Alternatively, a wrapper application can be used to manage multiple foreign applications (e.g., multiple instances of different foreign applications or multiple instances of the same foreign application).

With the present invention, there is no need to re-write a non-environment application to make it compatible with an environment. Using the present invention, a foreign application becomes compatible with the environment. Thus, a legacy application can be used in the environment without modifying the application.

DETAILED DESCRIPTION OF THE INVENTION

A method and apparatus for docking, launching, and running non-environment applications in an environment is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
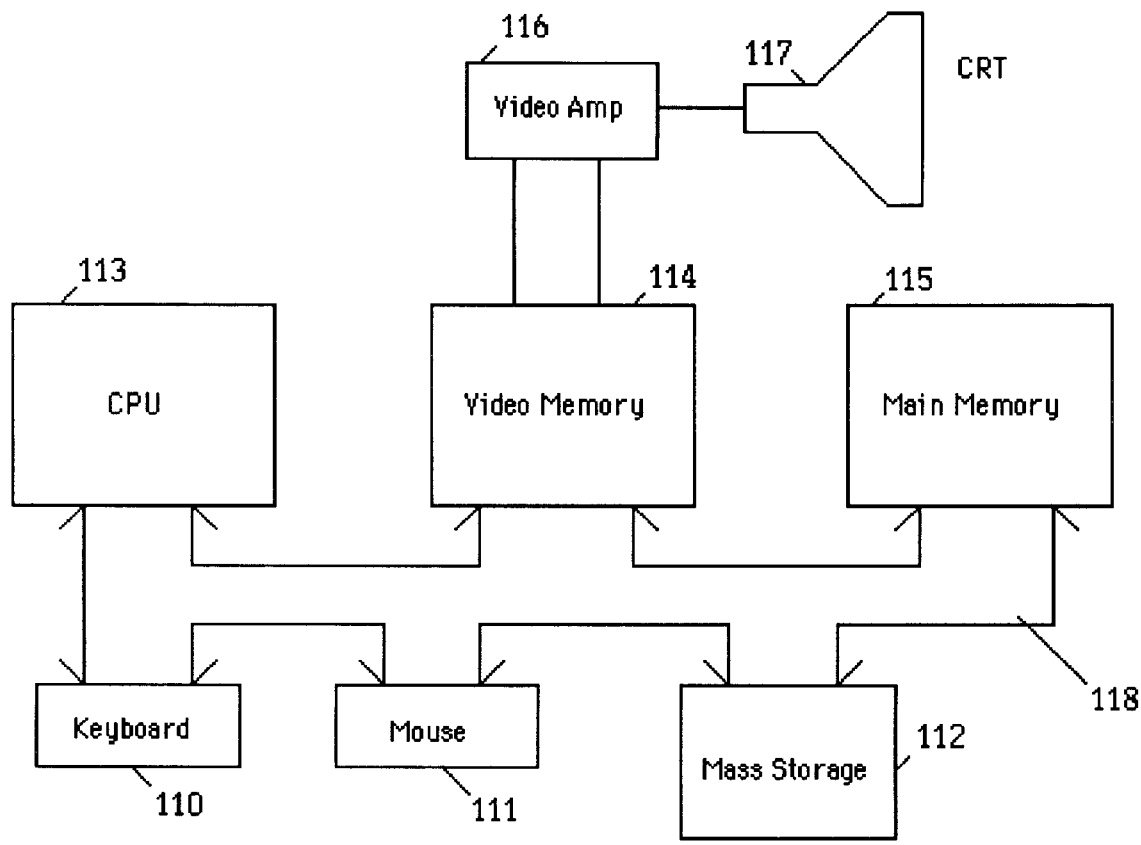
FIG. 1 provides an example of a general purpose computer to be used in accordance with embodiments of the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0 processor, a microprocessor manufactured by Intel, such as the 80×86 or a Pentium processor, or a SPARC microprocessor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and process flows described herein, it is configured to allow the docking, launching and running of non-environment, or foreign, applications.

An application that is written to run in a particular environment is referred to as an environment application relative to that environment. An application that is not written for an environment is referred to as a non-environment, or foreign, application of that environment. An application that is a foreign application of the OpenStep environment is referred to as a non-OpenStep application. An environment that is not the environment for which an application was developed is a foreign environment. Using embodiments of the present invention, an application can be run in a foreign environment. Alternatively stated, a foreign application can be run in an environment.

Figure 2A:
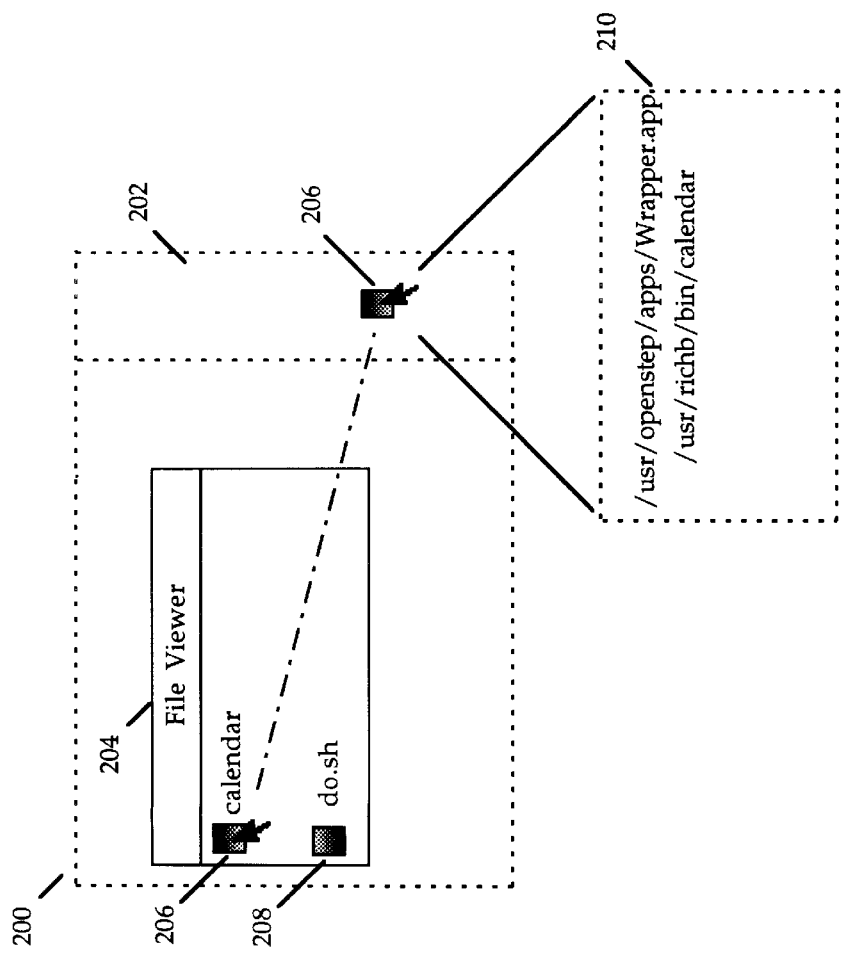
FIGS. 2A–2B illustrate an operation of an embodiment of the present invention.
Figure 2B:
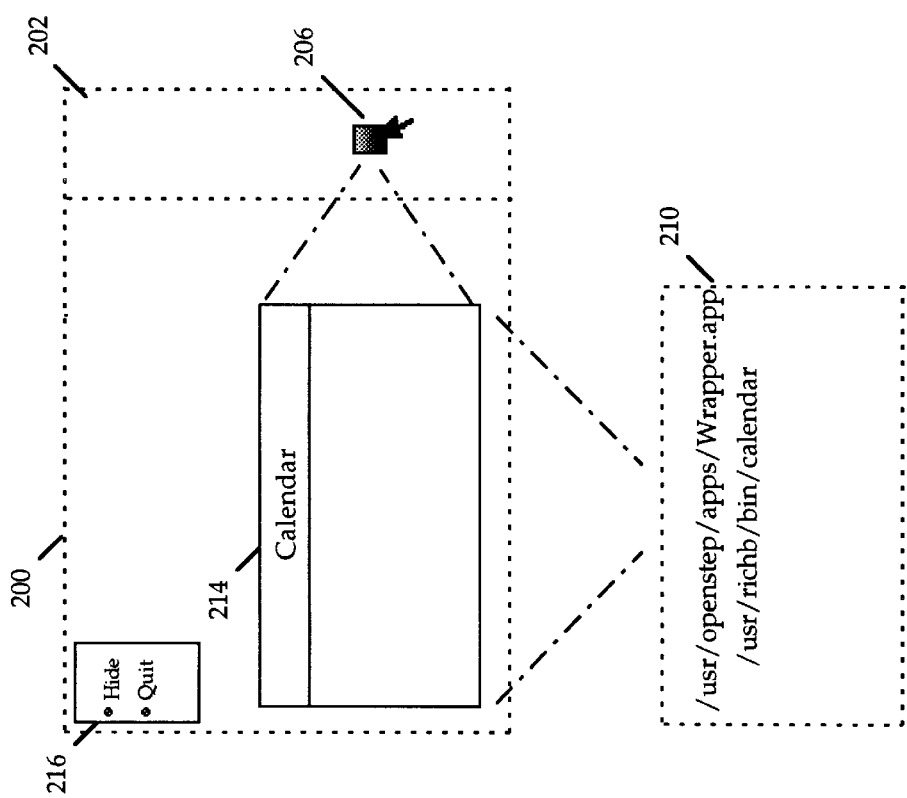

FIGS. 2A–2B illustrate the operation of an embodiment of the present invention. Referring to FIG. 2A, a display 200 contains a window 204 that is used to view file information. A foreign application is docked by dragging the foreign application's icon 206 into the docking region 202. Default information 210 is identified and stored for use with the foreign application. Default information 210 contains information that is used to locate the foreign application's executable file and wrapper application, for example. (See the section labeled "Default Information" below.) From the user's perspective, it does not matter whether icon 206 is associated with an environment application or a foreign application. The Dock application determines what type of application is associated with icon 206 and stores the appropriate information in default information 210.

A docked, foreign application is launched by the user in the same manner as a docked, environment application. Referring to FIG. 2B, the user selects icon 206. The Dock application consults default information 210 associated with the foreign application. Default information 210 specifies a wrapper application that is used to launch and manage the foreign application. In addition, default information 210 identifies the foreign application (e.g., a calendar application).

Figure 2C:
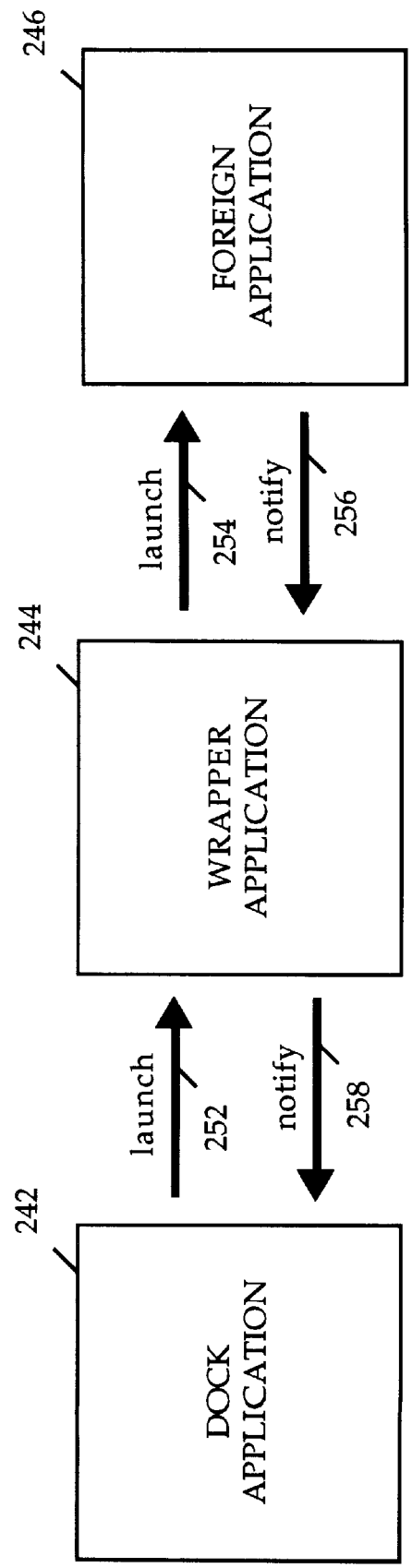
FIG. 2C provides an example of a block overview for launching and executing a foreign application.

When icon 206 is selected by the user, the foreign application associated with icon 206 is launched. FIG. 2C provides an example of the process overview for launching and executing the foreign application associated with icon 206 in accordance with embodiments of the present invention. Dock application 242 launches wrapper application 244 via launch operation 252. Wrapper application 244 launches the foreign application 246 via launching operation 254.

Referring to FIG. 2B, window 214 is displayed on screen 200 when foreign application 246 is launched. Window 214 is the main window for the foreign application 246 (e.g., calendar application). Wrapper application 244 creates a menu 216 that provides selections for hiding and quitting the foreign application. The wrapper application is notified when the user makes a selection from menu 216. Referring to FIG. 2C, a change in the status of foreign application 246 is communicated via notification path 256 to wrapper application 244. Wrapper application 244 forwards the notification to Dock 242 via communication path 258.

Wrapper Application

The wrapper application (e.g., wrapper application 244 in FIG. 2C) is an environment application. It acts as a wrapper for a non-environment application. In the following description, where the present invention is described in terms of the OpenStep environment, it should be apparent that the present invention has utility with any environment.

The wrapper application is associated with the foreign application. The wrapper application is, for example, an OpenStep application that is wrapped around a non-OpenStep application. A foreign application that is docked with the environment's Dock application is selected by selecting the application's icon (or Dock tile). When the foreign application is selected, the wrapper application launches the foreign application. The foreign application is launched as a child of the wrapper.

In the preferred embodiment, each foreign application has a wrapper application. According to this embodiment, a wrapper application is used to manage a single child. In an alternate embodiment, one wrapper is used to manage multiple foreign applications.

The present invention provides the ability to instantiate a second occurrence of the child application. The second occurrence of the child application can be managed by the same wrapper application. Alternatively, a second wrapper application can be used to manage the second occurrence of the child.

Where a single wrapper application is used to manage multiple applications, one occurrence of the wrapper application is launched. Before the wrapper application is launched, a determination is made whether the wrapper application has already been launched. If the wrapper application has already been launched, it is used to manage the foreign application. The wrapper application launches another child process. The wrapper application manages the new child in addition to any existing children. When a child process terminates, the wrapper application communicates the termination to the Dock application. If the child process is not the last child process, the wrapper application remains active to manage the remaining child processes.

A generic icon is associated with a docked, foreign application. The wrapper application can capture an image associated with the application when the application is launched. The application's generic icon is modified to include the captured image.

While the foreign application is running, the wrapper application waits for a change in status of its child. When a status change occurs, the wrapper application communicates the change to the Dock application.

Docking

A non-environment application is docked by dragging an icon associated with the application from the viewer, for example, to the Dock region. The Dock then determines whether the application is an environment application. For example, the Dock determines whether the application has a home directory and whether the directory contains an executable. If it is an environment application, the Dock stores the path name of the application's home directory in a set of default information. If it is a non-environment application, the Dock stores the path to the wrapper application along with the name of the non-environment application in the defaults information.

The non-environment application is, for example a binary-type, executable file. Alternatively, the non-environment application is a script such as a shell script. The Dock can determine the type of file (e.g., binary or shell file) by examining the contents of the file.

Figure 3:
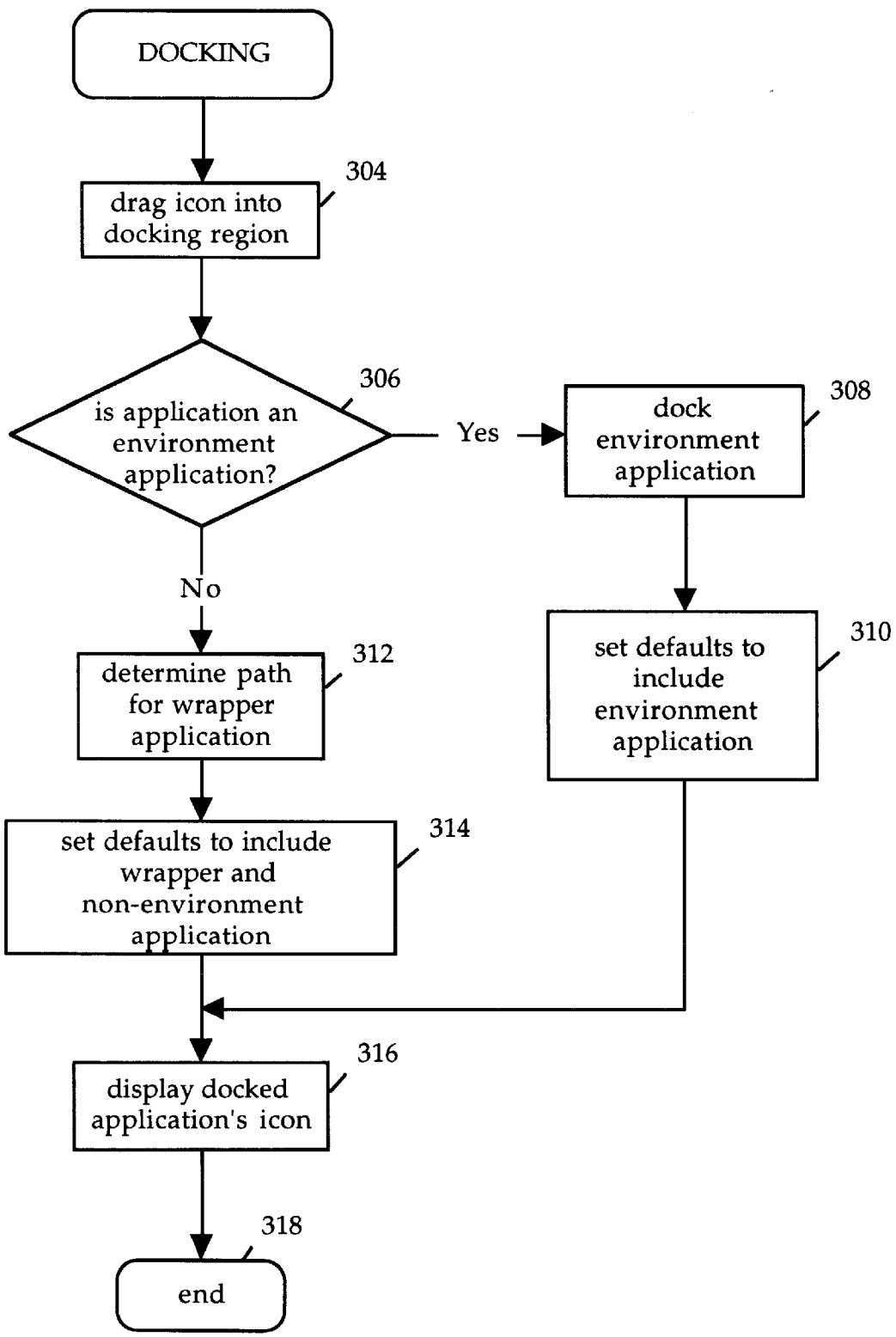
FIG. 3 provides an example of a process flow for docking a non-environment application in accordance with embodiments of the present invention.

FIG. 3 provides an example of a process flow for processing a docking operation for a foreign application in one embodiment of the present invention. At step 304, an image (e.g., an image in a file viewer or manager) is selected and dragged to the docking region. At step 306, the Dock application determines whether the application is an environment application. For example, an environment application is contained in a "home directory" that contains the application's executable and resource files. If the Dock application cannot locate a home directory, the Dock assumes that the application is not an environment application.

If the Dock application determines that the application is an environment application, it proceeds to dock the application as it does any other environment application. For example, the Dock application retains the path information for the environment application's home directory. The Dock application displays the docked environment application's icon in the docking region.

If the Dock application determines that the application is not an environment application (i.e., a foreign application), processing continues at step 312. The Dock application determines path information for the wrapper application at step 312. At step 314, the Dock application stores the path information for the wrapper and foreign applications.

At step 316, the Dock application displays an icon associated with the foreign application in the docking region. The foreign application's icon is, for example, a image of a terminal with label containing the name of the foreign application. Where the application name is too long for the icon, the application name is some number of characters of the application name and an ellipsis. The icon further includes a symbol (e.g., three dots) that indicate that the application is currently non executing. Processing of the docking operation ends at step 318.

A docked foreign application can be removed from the Dock by dragging the application's icon from the Dock region. In that case, the default information associated with the application is no longer needed.

Default Information

Each application has default information that is retained in a standard location. This information is saved in a file called "User.defs" under a directory called ".openstep" under the user's home directory, for example. Default information can be global defaults that affect all applications or local defaults used for a particular application.

An application's default information is used to locate the application's executable. In the preferred embodiment, a foreign application's default information consists of a path name pointing to the wrapper application's home directory. The home directory contains the wrapper application's executable. In addition, the directory contains resources (e.g., images) used by the wrapper application. In the preferred embodiment, the directory is a subdirectory of the Dock application direction (e.g., Workspace.app).

In addition, a foreign application's default information includes the name of the foreign application's executable. The default information further can also include command line arguments that are used to initialize the foreign application, for example.

Default information consists of semicolon separated strings of information. A string is associated with an application or multiple applications. The following provides an example of default information that specifies path information:

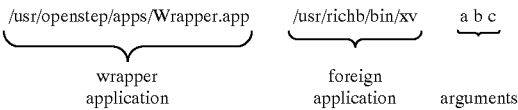

The above example is for illustration purposes only. Other techniques for storing default information can be used with embodiments of the present invention. The default string illustrated above contains substrings. The first string contains path information for the wrapper application. It acts as a pointer to the wrapper application. The docking application uses this information to launch the wrapper application when a user selects the foreign application for execution.

A pointer to the foreign application is contained in the next substring. The wrapper application retrieves this information to locate and launch the foreign application's executable. The default information can optionally include command line arguments. These arguments can be used by the foreign application to initialize its variables, for example.

The above example illustrates default information for use with a binary type foreign file. An embodiment of the present invention can also be used to dock, launch, and run non-binary files (e.g., shell scripts) in an environment. In the preferred embodiment, non-binary files are executed in a terminal window within the environment.

When a docked, non-binary application is selected for execution, the default information is used to locate the wrapper application, the terminal application and the non-binary file. The following provides an example of a default string for use with a non-binary file:

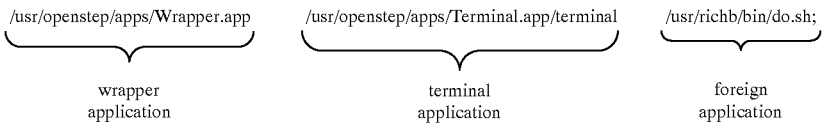

Like a binary-type file, the default information associated with a non-binary type application contains a pointer to the wrapper and foreign applications. The foreign application is a shell file. In addition, the default information includes a pointer to the application in which the non-binary file is executed. In this case, this application is a terminal application. The shell file is executed in the window of the terminal application.

Launching

Figure 4:
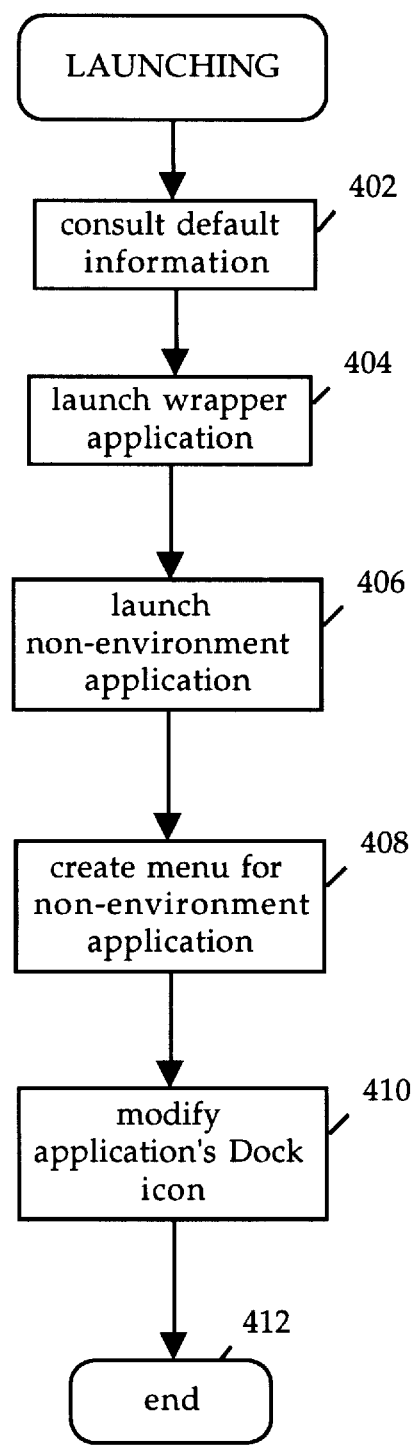
FIG. 4 provides an example of a process flow for launching a non-environment application in accordance with embodiments of the present invention.

From the user's perspective, a foreign application is launched in the same manner as an environment application. The user simply selects the icon located in the Dock that is associated with the foreign application. FIG. 4 provides a process flow for launching a foreign application in one embodiment of the present invention.

At step 402, the Dock application consults the default information to identify the path and application(s) to be launched. In the case of a foreign application, the default information specifies the wrapper application. The Dock application launches the wrapper application at step 404.

If the wrapper application manages multiple foreign applications according to one embodiment of the present invention, step 404 is modified to include a determination of whether the wrapper application has already been launched. If has not already been launched, the wrapper application is launched.

The default information is used by the wrapper application to determine the path and identity of the foreign application. The wrapper application launches the foreign application at step 406. In the case of a binary-type foreign application, the wrapper application simply launches the foreign application. In the preferred embodiment, the wrapper application launches the application by forking a process that executes the foreign application. The forked process is a child of the wrapper application. The wrapper establishes a means for communicating with its child process. Preferably, the wrapper application uses a SIGCHLD handle that is called when a child process of the wrapper application (e.g., a foreign application) terminates. Alternatively, the wrapper application creates a pipe to receive notifications from its child, for example.

Where the foreign application is of a non-binary file type, another application, an intermediate application, is used to run the foreign application, the wrapper application launches the intermediate application. The intermediate application launches the foreign application. For example, the foreign application is a shell file that is executed in a window of the terminal application. The intermediate application is the terminal application. The wrapper application launches the terminal application. The terminal application launches the shell script within a window of the terminal application.

When a docked, environment application is launched, a menu is created that can be used by the user to hide or quit the application. The same type of menu is created for a foreign application at step 408 by the wrapper application. The docked application's tile is modified to indicate its change in status (i.e., executing) at step 408. For example, while a docked, environment application is being launched, the application's tile is shaded, or grayed. When launching is completed, the tile is returned to its original shading. Further, a symbol that indicates that the application is not running (e.g., ellipsis) is removed from the icon. Preferably, the wrapper application removes the symbol from the tile and the Dock application shades the icon (during the launching process) and returns in to its original shading (once the launching process is completed) at step 408.

The wrapper can further adjust the application's icon at step 408. As an option, the wrapper application can grab an image associated with the application's main window (i.e., the image that would be drawn in the icon if the application was iconified) and place that in the application's icon in the dock.

Before the foreign application is launched, the icon associated with a docked foreign application is the image of a terminal. The terminal's screen contains the approximately five or six letters of the application's name. If the foreign application's name is longer than 5–6 letters, an ellipsis is appended to the end to signify that the name contains additional letters.

When the foreign application (e.g., when a create/notify event for an X application occurs), is launched, the wrapper application captures the image contained in the icon window of the application. The create/notify event is captured by the wrapper application. The identity of the application's main window is retrieved by the wrapper application from the create/notify event. The wrapper application determines the location of the icon image map from the create/notify event. The wrapper application retrieves the image and stores the image in the dock tile (i.e., the foreign application's icon in the Dock region) associated with the foreign application in the Dock.

Running

Figure 5:
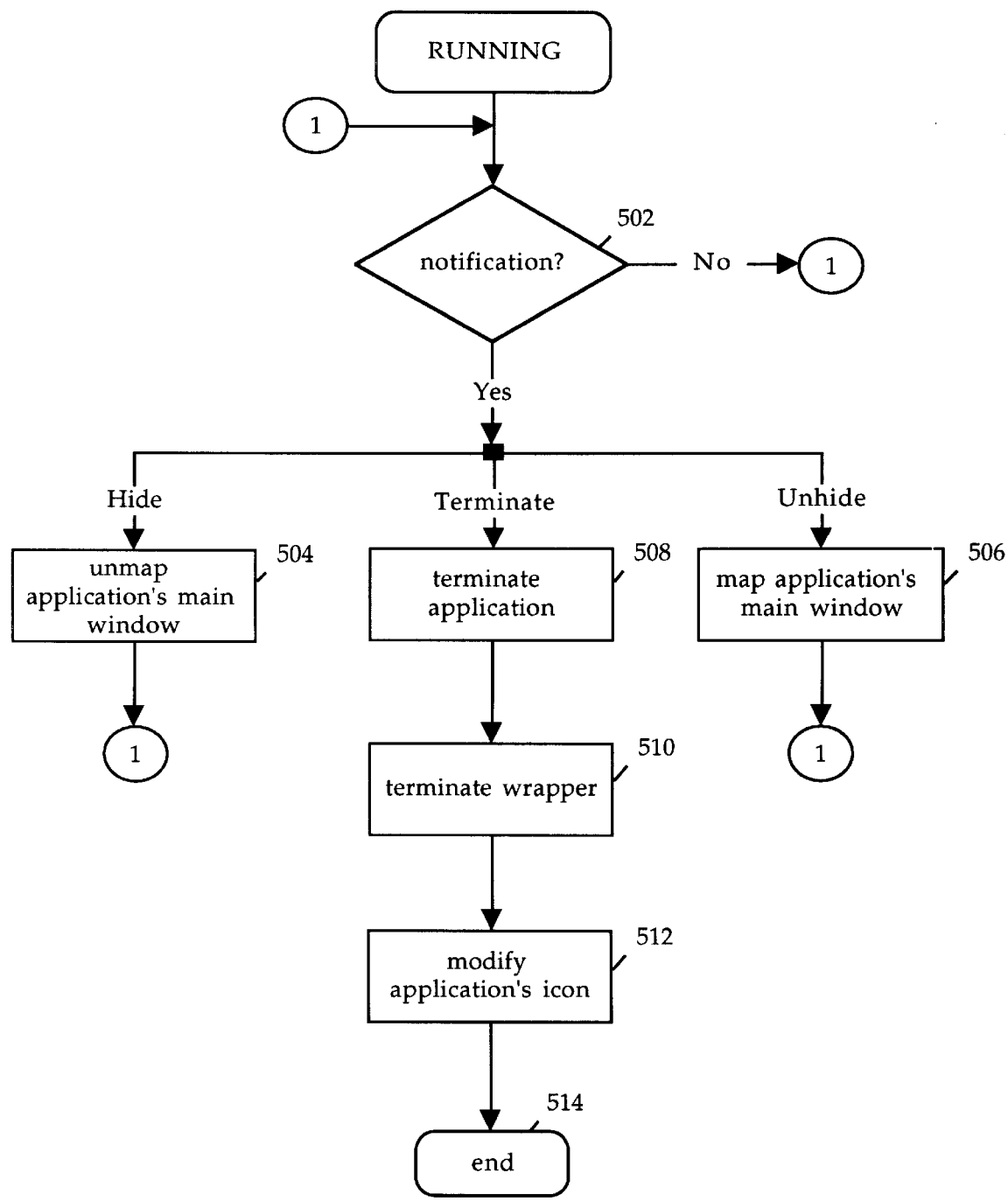
FIG. 5 provides an example of a process flow for running a non-environment application in accordance with embodiments of the present invention.

As the foreign application is running, the wrapper application waits for a signal from its child (i.e., the foreign application). There is no need for the wrapper application to communicate with the Dock application until the foreign application terminates. When a change in status occurs for the foreign application, the wrapper application is notified. The wrapper application awakens and performs the necessary processing based on the notification. FIG. 5 provides a process flow for executing a foreign application in one embodiment of the present invention At step 502, the wrapper application waits for a notification from the foreign application. If a notification is received, the wrapper awakens and performs steps 504, 506, or 508 based on the type of notification. If the user has selected the "hide" operation from the menu associated with the foreign application, the wrapper application unmaps the foreign application's main window at step 504. To "unhide" an application (i.e., its main window), a user typically double clicks on the application's tile in the Dock. If an "unhide" command is detected from the user, the wrapper application maps the foreign application's main window at step 506.

If the user selects the "quit" operation from the menu, or the wrapper application receives notification that the foreign application is terminated, the wrapper application awakens and processes the notification. If the foreign application is still running, the wrapper application terminates the application at step 508. The wrapper application then terminates at step 510. The termination of the wrapper application is detected by the Dock application.

If the wrapper application manages multiple foreign applications according to one embodiment of the present invention, step 505 is modified to make a determination whether the foreign application is the last child of the wrapper application. If it is not the last child, the wrapper application notifies the Dock application, if necessary, without terminating. For example, should the Dock application need to perform an operation when a docked application terminates, the wrapper application can notify the Dock application when one of its child processes terminates. When it receives this notification, the Dock application can perform the operation. If, however, there is no need to notify the Dock application when a child process terminates, the wrapper application simply notifies the Dock when it terminates. In either case, when the last child process terminates, the wrapper application terminates thereby notifying the Dock application that all of the foreign applications managed by the wrapper application have terminated.

The Dock returns the application's tile to its original state at step 512. The process flow ends at step 514.

Thus, a method and apparatus for docking, launching and running foreign applications in an environment has been provided.

What is claimed is:

1. A method of running a foreign application in an environment having a docking region, said method comprising the steps of:

docking a foreign application in a docking region of a windowing environment, said foreign application written for a non-docking environment;

selecting for execution said foreign application; and launching said foreign application;

wherein said docking comprises the steps of:

dragging a representation of said foreign application to said docking region;

storing a path to said foreign application and a path to an associated manager application; and said associated manager application configured as a wrapper application for launching and managing the execution of said foreign application.

* * * * *